United States Patent [19]

Rose et al.

[11] 4,443,175

[45] Apr. 17, 1984

[54] APPARATUS AND METHOD FOR RUNNERLESS TRANSFER MOLDING OF THERMOSET COMPOUNDS

[76] Inventors: Robert H. Rose, 13850 Forest Grove Rd., Brookfield, Wis. 53005; Allen J. Rose, W209 S6876 Stonecrest, Muskego, Wis. 53150

[21] Appl. No.: 439,420

[22] Filed: Nov. 5, 1982

[51] Int. Cl.$^3$ .................. B29F 1/04; B29F 1/08
[52] U.S. Cl. ................. 425/208; 264/328.4; 264/328.5; 425/543
[58] Field of Search ............ 264/328.4, 328.5; 425/543, 208

[56] References Cited

U.S. PATENT DOCUMENTS

| | | | |
|---|---|---|---|
| 2,413,401 | 12/1946 | Youngblood | 264/328.5 |
| 2,442,368 | 1/1948 | Maynard | 264/328.4 |
| 2,734,226 | 2/1956 | Willert | 18/30 |
| 3,133,316 | 3/1964 | Arpajian | 18/30 |
| 3,320,397 | 5/1967 | Alexander | 264/328.5 X |
| 3,591,897 | 7/1971 | Perres | 18/30 HM |
| 3,609,817 | 10/1971 | Deerberg | 18/30 HH |
| 3,661,487 | 5/1972 | Susin | 425/191 |
| 3,819,312 | 6/1974 | Arpajian | 425/242 R |
| 3,959,433 | 5/1976 | Sauers | 264/328 |
| 3,969,461 | 7/1976 | Boesch | 264/328.5 X |
| 4,017,242 | 4/1977 | Mercer | 425/243 |
| 4,238,181 | 12/1980 | Dannels et al. | 425/543 |
| 4,260,359 | 4/1981 | Dannels et al. | 425/543 |
| 4,306,852 | 12/1981 | Mateev | 425/549 |
| 4,318,686 | 3/1982 | Morgan | 425/543 |

OTHER PUBLICATIONS

Modern Plastics, Dec. 1966, page 97, "A New Day for Thermosets".
Plastics Eng. Handbook, 4th Ed. Van Nostrand, Reinhold Co., pp. 223–226, "Screw Transfer Molding".

*Primary Examiner*—Jan H. Silbaugh
*Attorney, Agent, or Firm*—Robert T. Johnson

[57] ABSTRACT

There is described, apparatus and method for runnerless transfer molding of thermoset compounds, comprising feeding plasticized compound directly into dies through gates and nozzles by means provided to transfer plasticized compound extrudate into a cylinder to be forced by a ram directly into the dies through nozzles and gates, and wherein cured compound in the cylinder may be readily withdrawn from said cylinder by withdrawal of the ram from said cylinder, and cured sprue of compound removed from said ram.

5 Claims, 10 Drawing Figures

APPARATUS AND METHOD FOR RUNNERLESS TRANSFER MOLDING OF THERMOSET COMPOUNDS

SUMMARY OF THE INVENTION

This invention discloses apparatus and method for Runnerless Molding of thermoset molding compounds, and comprises means to transfer plasticized compound from a screw plasticizer to a cylinder in a molding press, from which cylinder the plasticized molding compound is forced into die cavities by means of a ram.

The plasticized material is forced into the dies the cylinder through a nozzle and gate directly in to the die without a runner.

Transfer of plasticized molding compound from the screw plasticizer to the cylinder in the molding press is by means of a cup for plasticized compound which travels from a vertical position to a horizontal position at which point the plasticized compound slug rolls into the cylinder of the molding press.

The cylinder of the molding press in this invention is movable to and from the heated die. This is to prevent the material in the cylinder from setting up, or curing.

The above cylinder has its own independent temperature control.

There are at present many methods of molding Thermoset Molding Compounds which methods are as follows:

(1.) Compression Molding—This method comprises filling the die cavities with molding compound either as powder or preforms, then closing the die to form and cure the moldings.

(2.) Transfer Molding—This method comprises forcing the heated plasticized compound through runners and gates into the cavities. The plasticized compound is usually heated preforms manually dropped into the so-called transfer pot then forced by a ram through runners and gates to the die cavities.

(3.) Injection Molding—This method comprises feeding the granular compound into a cylinder wherein the compound is heated to be plasticized, then this plasticized material is injected into the die runners, through the gates and into the cavities of the die.

All of the above molding methods are well known to those in the plastic molding field.

There are many variations to the above mentioned molding methods, which variations solve problems that arise.

Each of the above methods of molding has disadvantages, for example—compression molding usually requires longer cure time than either transfer or injection molding methods.

Transfer molding, while having a reduced cure time, has the disadvantage of scrap generated as runners. This method also requires preheated material, such as preheated preforms, which involves extra handling of the molding compound.

Injection molding has the disadvantage of scrap generated as runners, in conventional dies.

U.S. Pat. No. 3,133,316 to Arpajian for Molding Apparatus. This apparatus comprises a screw plasticizer, with the plasticized thermoset material being fed into a cylinder to then be transferred into the dies through a sprue and runner system.

In view of the scrap generated in injection molding, so called "runnerless" dies have been developed, as shown in U.S. Pat. No. 3,591,897 to Perres. However, there are problems encountered in this method of molding. This patent speaks of a layer of thermal insulation in the die to separate the runner system from the die to prevent curing of the molding compound of thermoset material.

The main disadvantage of this "Runnerless" die is the complexity of dismantling the die when there is a plug of cured compound in the manifold or gates of the cavities of such a die.

U.S. Pat. No. 3,609,817—Deerberg et al. This is a straight injection molding apparatus and means for sprue and runner removal. This patent operates in a different manner than this instant Rose application.

U.S. Pat. No. 3,819,312 to Arpajian for "Cold Runner Injection Mold for Thermosetting Resins". There is disclosed in this patent a "cold" runner system for injection molding of thermosets and means for thermally insulating the sprue section, from the mold cavity section. This is to reduce the cure rate of the thermosetting material in the sprue section. With this sprue section, there is a problem when the material in this sprue area cures, which then requires disassembly of the die to remove the cured sprue.

U.S. Pat. No. 4,017,242 to Mercer for "Injection Molding Apparatus". This patent discloses injecting the plasticized material into a distribution chamber thence into the molding cavities through a runner system. Here again, there is a problem of disassembly of the die when the material in the distribution chamber becomes cured. In addition, this patent calls for two heating zones.

U.S. Pat. No. 4,260,359 to Dannels—"Apparatus for Runnerless Injection Molding Thermosetting Materials". This invention comprises an improved nozzle feed assembly having a temperature controlling means disposed therein. The plasticized or melted material passes over a flattened conical member and is then directed axially outward through runners to fill the die cavities.

The disadvantage of this apparatus is that disassembly of the die is necessary when the material at the flattened conical section becomes "cured" and thus stops flow of material into the die cavities.

So called runnerless molding is shown in U.S. Pat. No. 4,306,852 to Mateev; however, this method is not adaptable to molding of thermoset compound, but only for thermoplastic compound, particularly foaming thermoplastic compound. As stated in the above patent—"-that it permits molding without a sprue when the diameter of the closing valve is large—".

Other references pertaining to this present application are as follows:

| U.S. Pat. No. | Patentee |
| --- | --- |
| 2,734,226 | Willert |
| 3,661,487 | Susin |
| 3,959,433 | Sauers |
| 4,017,242 | Mercer |
| 4,238,181 | Dannels |
| 4,318,686 | D. W. Morgan |

In addition to the above patents, the following references are hereby included.

Modern Plastics Jol—Dec. 1966 page 97 "A new day for Thermosets".

Plastics Engineering Handbook 4th ed.; Van Nostrand Reinhold Co.; pages 223-226, "Screw Transfer Molding".

It is an object of this present invention to disclose apparatus for runnerless molding. To be more specific, it is an object of this present invention to disclose apparatus for runnerless molding of thermoset compound.

Another object of this invention is to disclose apparatus for transferring plasticized thermoset material from a screw plasticizer to an injection cylinder by means of a cup for plasticized compound.

Another object of this invention is to disclose apparatus for runnerless transfer molding by injecting plasticized compound directly into the molding cavity through a "live" gate.

The "live" gate above mentioned is meant to describe the feed of plastic material from the nozzles to gate 37 and die gate 6—this live gate is then the transition from the nozzle to gate to the die cavity.

Another object of this invention is to disclose a method of molding thermoset plastic molding compound comprising feeding said plastic compound into a die through a gate with said gate being directly connected to said plasticized compound in the feed cylinder.

Another object of this invention is to disclose apparatus for runnerless molding, and to remove cured compound from the injection cylinder, as required, as part of the molding cycle.

Another object of this invention is to disclose apparatus and method of removing cured molding compound from the feed cylinder chamber by means of altering the molding cycle. This then does not require disassembly of the die, as pointed out in some of the above reference patents.

Another object of this invention is to disclose runnerless injection molding apparatus for thermoset molding comprising a reciprocating screw plasticizer and means to cut off a segment of plasticized compound extruded from the plasticizer, dropping said segment of plasticized compound, otherwise known as extrudate, in a transfer cup in an upright position and means to tilt said cup through 90° to a horizontal position to deposit said plasticized compound in a horizontal cylinder, said cylinder being the feed chamber to the nozzle and gate of the die, said plasticized compound being forced through said nozzle and gate to the die by action of an injection ram plunger.

Another object of this invention is to disclose a runnerless injection molding apparatus, for thermoset molding compound wherein a horizontal cylinder as feed chamber to the nozzle and gate of the die is separable from the heated die during part of the molding cycle, and the horizontal cylinder has means for temperature control independent of the die temperature.

A further object of this invention is to disclose means to hold the horizontal cylinder, nozzle and gate thereof in contact with a die cavity and mounting platen when compound is being forced through the nozzle and gate into the die cavity by an injection ram plunger.

Another object of this invention is to disclose means wherein cured sprue and nozzle compound becomes attached to a dovetail groove in the face of the injection ram plunger; thus, when said ram plunger is withdrawn from the horizontal cylinder, the cured sprue and nozzle compound is forced off of the dovetail groove on the ram face by means of impact of the leading edge of outer surface of cup for transferring plasticized compound, hitting the cured sprue compound, in a direction parallel to the dovetail groove, while depositing plasticized compound in movable horizontal cylinder internal bore.

A further object of this invention is to disclose means to transfer plasticized thermoset compound in a predetermined amount from a screw plasticizer to a movable horizontal cylinder by means of cup for transferring plasticized compound, swung through a 90° arc or thereabout to a horizontal position to deposit the plasticized compound in the internal bore of a movable horizontal cylinder.

Another object of this invention is to disclose means to position a movable horizontal cylinder containing plasticized thermoset compound, in contact with the molding die cavity and platen and then to fill the die cavity with the compound by action of an injection ram plunger.

A further object of this invention is to disclose means to actuate a movable horizontal cylinder to be in contact with the molding die and platen while filling the die cavity with molding compound and to separate the movable horizontal cylinder from the molding die and platen on curing of the molding compound in the die.

Vertical plate 47 is located in the center of cup 12 for plasticized compound, which plate, in the vertical position, serves to cause the plasticized compound slug 15 to be tilted onto its edge to be in a rolling position, when the cup 12 is in a horizontal position.

Figure 4:
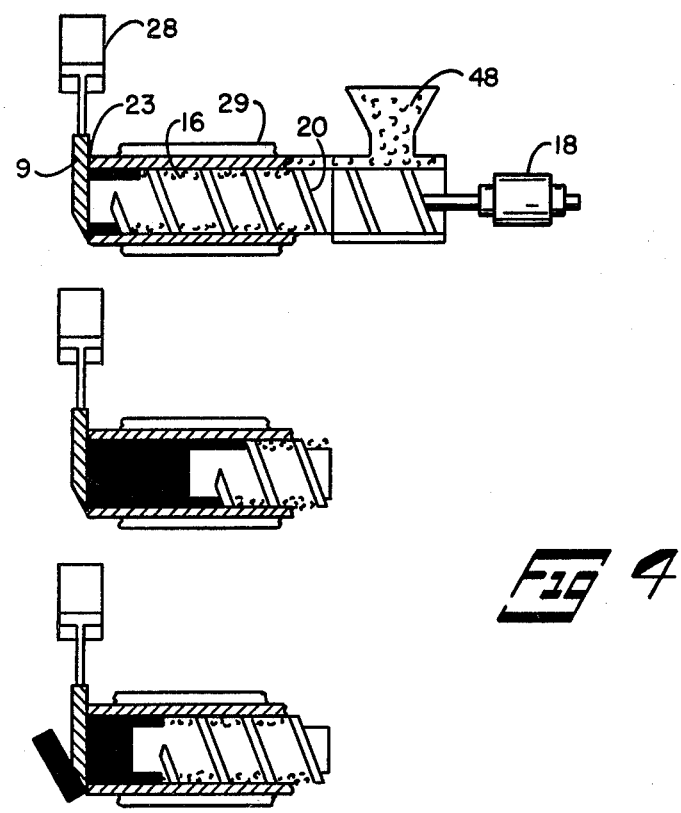

FIG. 4 is an enlarged elevation view of the reciprocating plasticizing screw 20 in screw plasticizing cylinder 16 and guillotine blade 9 and hydraulic cylinder 28 to drive blade 9.

Figure 5:
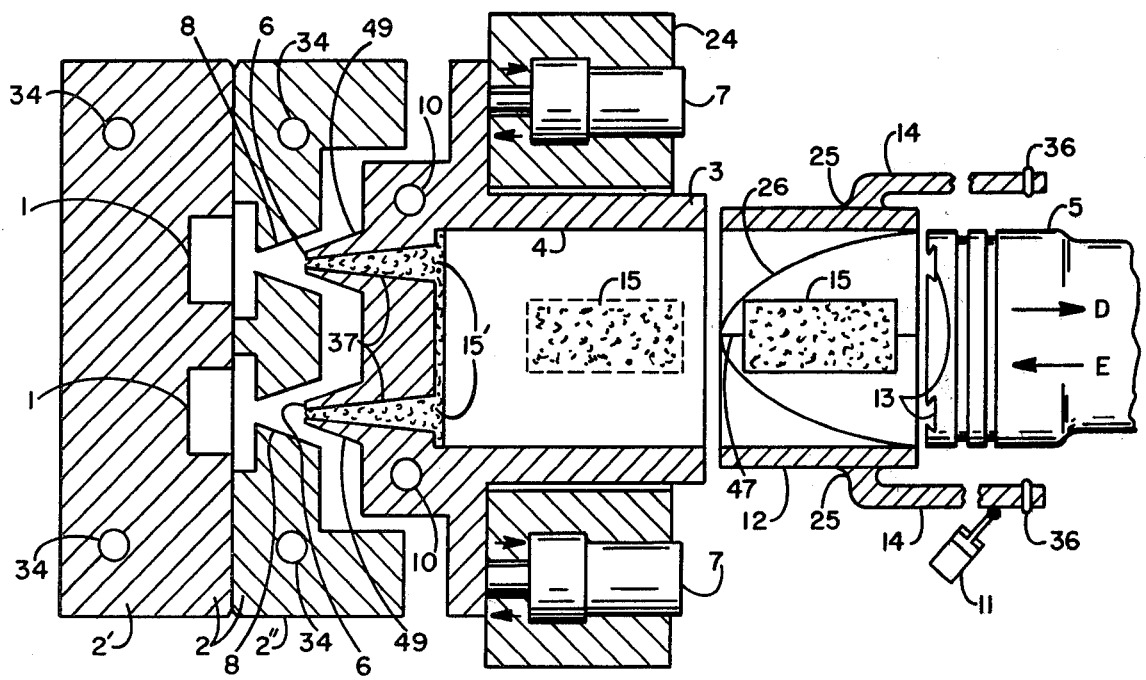

FIG. 5 is an enlarged plan view of th Injection Molding section of the die apparatus at the start of the stroke to fill the cylinder 4 with plasticized compound 15.

Figure 6:
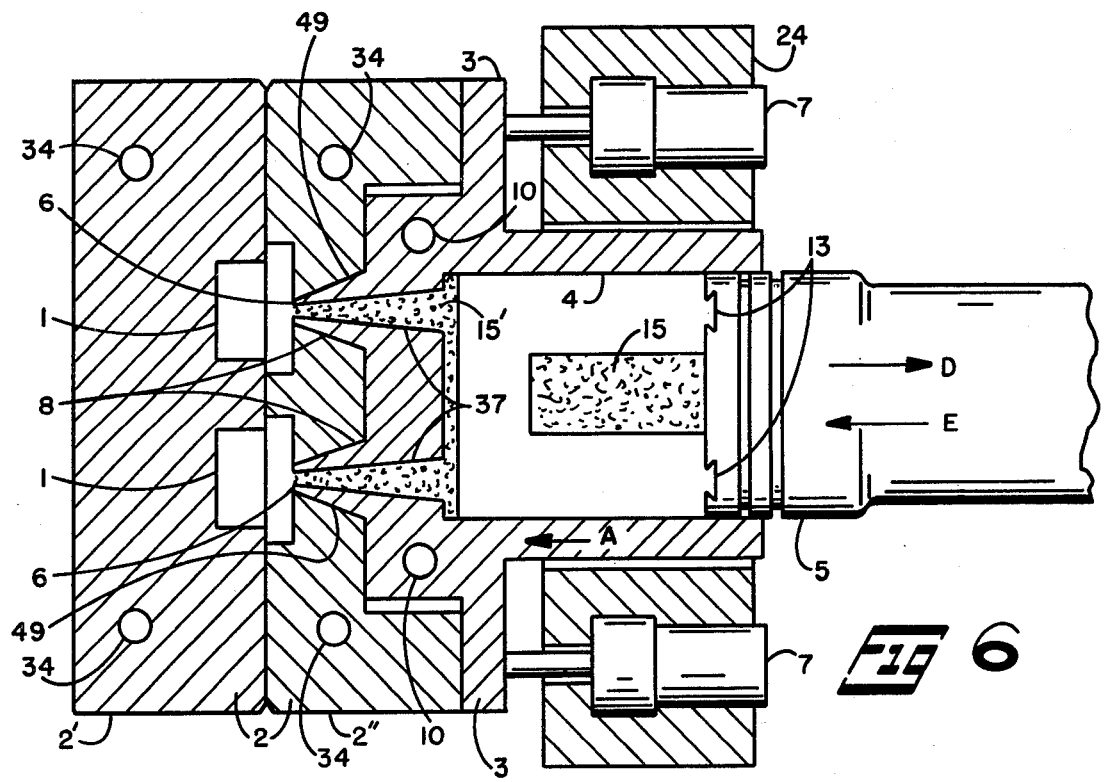

FIG. 6 is a plan view and is the next sequence of the molding operation following FIG. 5. In this FIG. 6, movable cylinder 3, containing the plasticized material 15 in movable horizontal cylinder internal bore 4 is moved forward by cylinders 7 in the direction of arrow A to make contact with die platen 2". The die platens 2' and 2" are held closed. Injection ram 5 is now moving forward as indicated by arrow B to feed molding compound into the die cavities.

Figure 7:
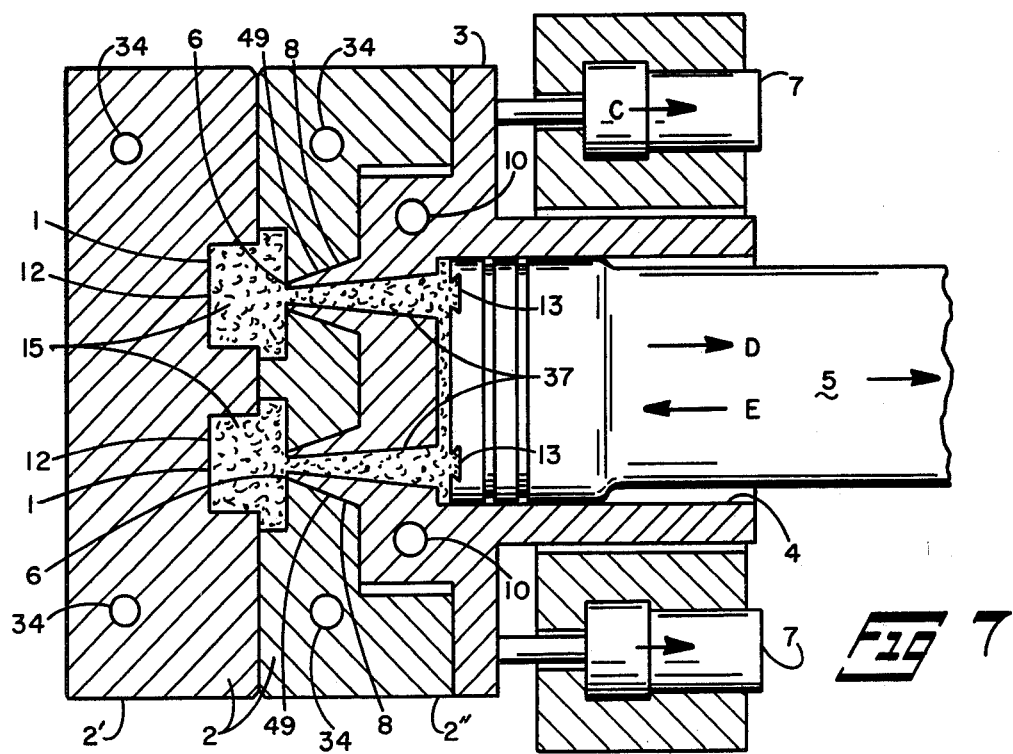

FIG. 7 is a plan view of the molding operation next in sequence after FIG. 6. In this FIG. 7, the injection of compound 15 into the dies 1, is now completed by injection ram 5. Injection ram 5 is now ready to be retracted in direction D. Hydraulic cylinders 7 can then be retracted in the direction of arrows C.

Figure 8:
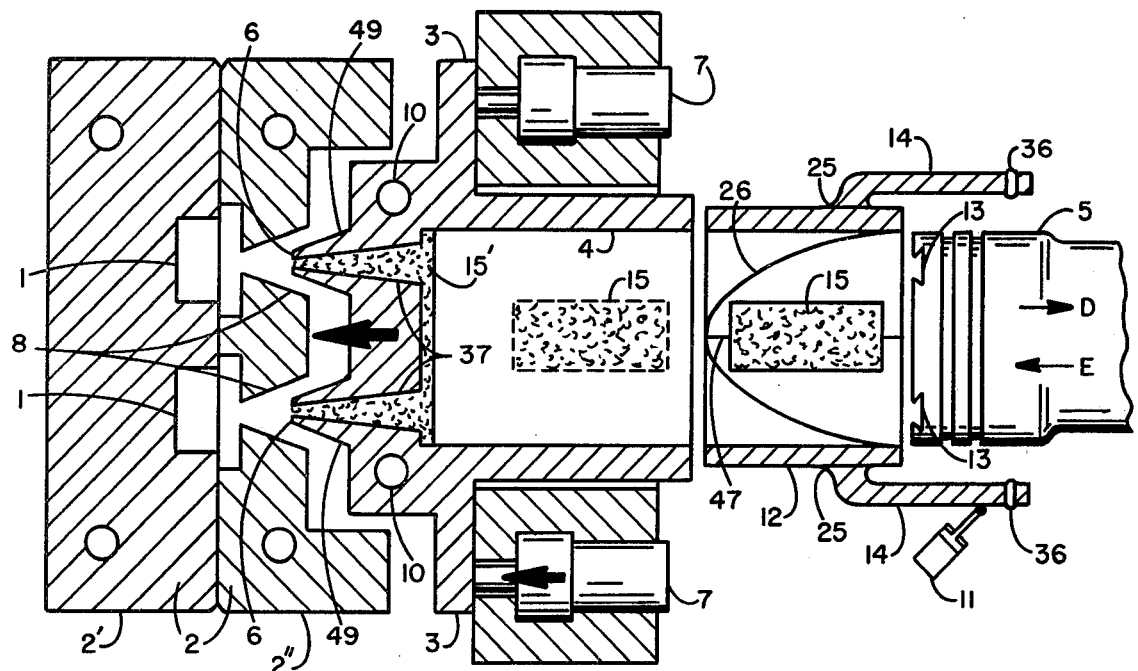

FIG. 8 is a plan view of the molding operation next in sequence after FIG. 7. In this FIG. 8, a new molding cycle has started with cup for plasticized material 12, moved to the horizontal position by hydraulic cylinder 11, attached to arm 14. The cup 12 with the diagonal cup bottom 26 spills the plasticized compound slug 15 into movable horizontal cylinder internal bore 4, to start this new molding cycle. Cylinder 3 is at this time of the cycle, retracted from contact with cavity section 2″ die block 2. This then prevents drain of heat from die block 2″ stationary cavity platen section.

Figure 9:
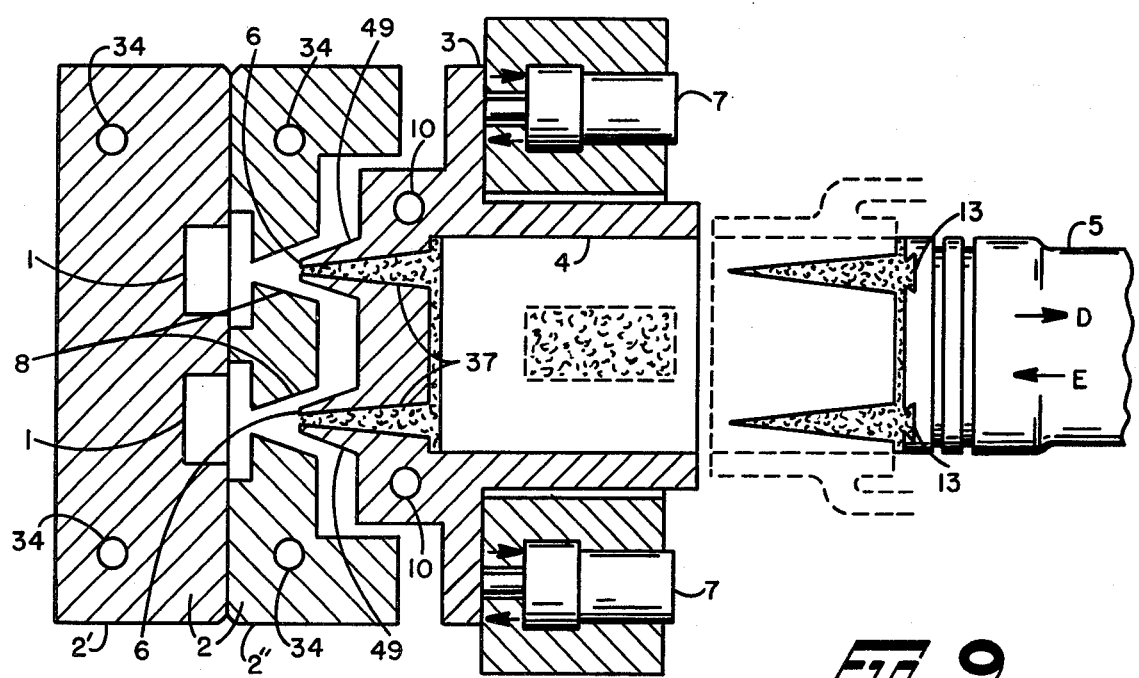

FIG. 9 is a plan view to show cured compound 15″ attached to sprue holder slots 13, as withdrawn from the nozzles to gates 37. This cured compound 15″ is then stripped from sprue holder slots 13 by the impact of cup for plasticized material 12 when dropped to the horizontal position to deposit plasticized material 15 into the cylinder 4.

Figure 10:
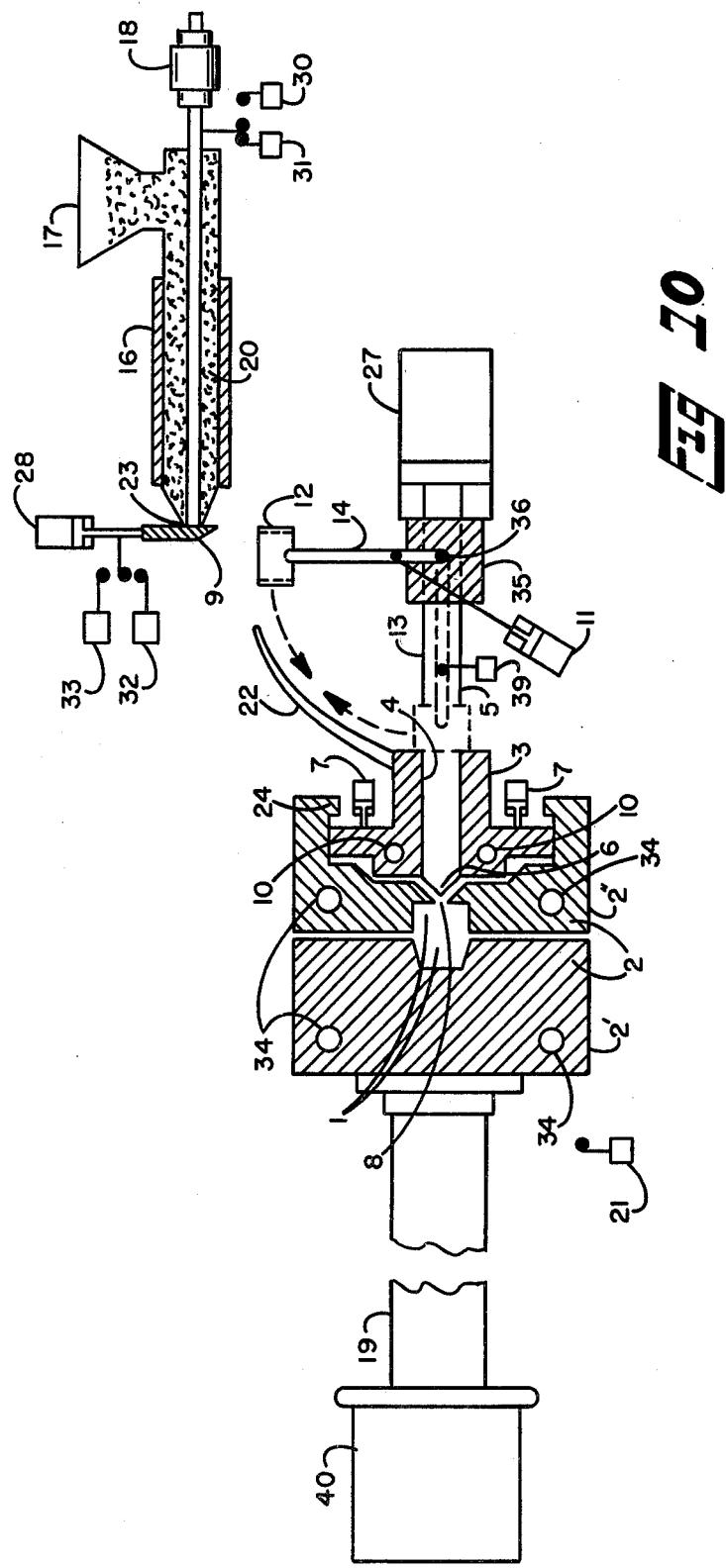

FIG. 10 is an alternate press set-up, wherein the movable platen 2′, is on the opposite side of the injection ram plunger 5 and the stationary platen 2″.

DESCRIPTION OF INVENTION

This invention comprises a molding press wherein thermoset material 48 is plasticized in a reciprocating 20 screw-type extruder in plasticizing cylinder 16. A predetermined amount of plasticized material is fed out of the extruder as a plasticized compound slug 15 and cut off from the plasticizing cylinder end 23 by a guillotine blade 9. This plasticized compound slug 15 is dropped into cup for plasticized compound 12, in vertical position which cup has a diagonal bottom 26 and vertical fin 47, said plasticized compound slug is deposited from cup 12 to a horizontal movable cylinder 3 with internal bore 4. This movable cylinder 3 with an internal bore 4 has a controlled temperature means 10 independent of the die temperature. In addition, this movable cylinder 3 is separable from the stationary die section platen 2″ when plastic material is not being fed into the die cavity 1 or cavities.

In further discussion of this present invention, knock outs are not shown as these are well known in the molding art.

Movable horizontal cylinder 3 comprises, in addition to the cylinder section 3, an internal bore described as movable horizontal cylinder internal bore 4, and nozzles to gates 37, having a tapered outer dimension of nozzle 49. This tapered outer dimension of nozzle to gates 49, is of such dimension and taper to fit into taper of nozzle aperture 8, with a minimum of clearance to prevent flow of plastic between outer dimension of nozzle gates 49, and nozzle aperture 8 when plastic is forced into the dies 1, by injection ram plunger 5.

As an example, the taper above mentioned, could range from 0° to 10° or more. To have 0° taper then requires further backward travel of cylinder 3, to disengage contact of outer dimension of nozzles to gates 49 from nozzle apertures 8.

The above and the following description is in terms of plural dies but will be applicable to a single cavity as well.

In the conventional runnerless die, a problem is encountered in removal of cured compound from the runner system, however, in this present invention means are provided to remove cured compound 15″ from the movable cylinder internal bore 4 and nozzles 37, to gates 6 by allowing cure of compound 15″ in contact with the injection ram 5 at sprue holder slots 13, then withdrawing the ram 5 from movable cylinder internal bore 4. This cured compound is then stripped off of injection ram 5, held in sprue holder slots 13, on hitting of the cured sprue 15″ section by the cup for plasticized material 12 when said cup is moved to the horizontal position to deposit plasticized compound slug 15 into movable cylinder bore 14 for molding of components in the dies.

There follows a more complete listing and decription of the components comprising this invention which will be readily understood by those knowledgeable in the art of molding thermoset compound.

Figure 1:
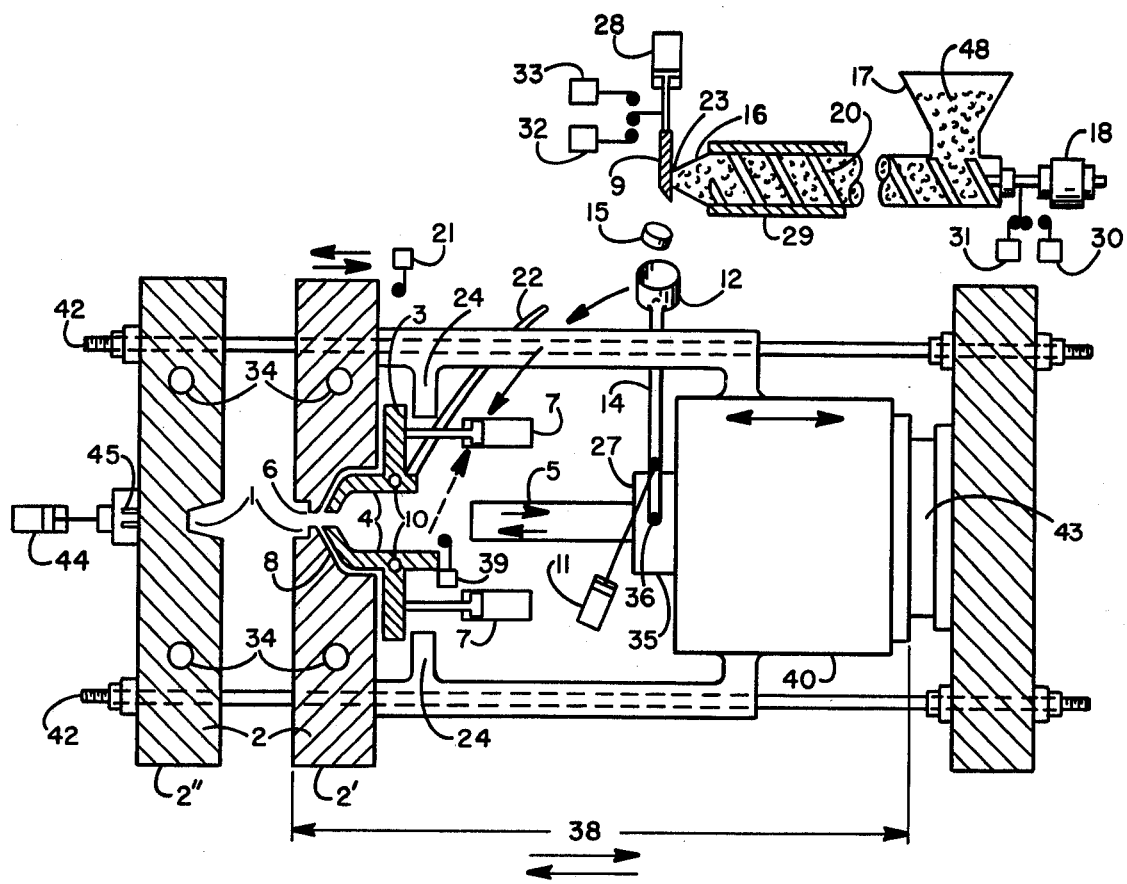
FIG. 1 is an elevation drawing of the Runnerless Injection Molding press and Die Apparatus, which is preferred in carrying out this invention. The numbers of the press components are as listed.

1—die cavity
2—die blocks; 2′—movable cavity section; 2″ stationary cavity section
3—movable horizontal cylinder
4—movable horizontal cylinder internal bore
5—injection ram plunger
6—die gate
7—hydraulic cylinders
8—guide for nozzles or nozzle aperture
9—guillotine blade
10—inlet and outlet ports for heat exchange medium in movable horizontal cylinder 3
11—hydraulic cylinder for cup transport
12—cup for plasticized compound
13—dovetail sprue holder grooves FIG. 5
14—arms for cup mount
15—plasticized compound slug, 15′—plasticized compound 15″ cured compound
16—screw plasticizer cylinder
17—feed hopper
18—Motor drive for plasticizer screw
19—hydraulic cylinder piston
20—reciprocating plasticizing screw
21—limit switch
22—cup cover barrier guide
23—plasticizing cylinder end
24—guide stop
25—cup arm anchors
26—diagonal cup plate
27—hydraulic cylinder for injection ram 5
28—hydraulic cylinder for guillotine blade 9
29—jacket for heat exchange medium
30—limit switch Feed Screw
31—limit switch Feed Screw
32—guillotine limit switch
33—guillotine limit switch
34—Die block heaters to supply heat to cure compound in die cavity
35—Cup arm mount block
36—Cup arm pivot mounts
37—nozzles to gates
38—clamp and injection ram through and including movable platen unit 2′ of FIG. 1
39—Limit switch for arm 14
40—Main clamp cylinder
41—Clamp Hydraulic cylinder
42—Tie Rods
43—Clamp piston
44—Knock out cylinder
45—Knock out pins as required
46—Clamp anchor plate
47—Vertical fin in cup 12 for plasticized compound
48—Unplasticized thermoset molding compound
49—Outer dimension of nozzles to gates Referring to above list of components, note that 38 includes all molding components including main clamp cylinder to and including movable platen 2'; thus, unit 38 rides on the tie bars 42.

DETAILED DESCRIPTION OF INVENTION

Injection molding of thermoset compounds has presented problems of cured scrap and also entrapped volatiles in the plasticized compound as injected into the molding dies.

This present invention comprises a screw plasticizer 20, which extrudes a pre-set amount of plasticized compound 15, which amount of material is cut off of the extruder by a guillotine blade 9. This plasticized cut-off piece, or slug of material 15, is dropped into cup 12 for plasticized compound.

This cup 12, for plasticized compound, is then tilted to the horizontal position through about 90° by hydraulic cylinder 11 for cup transport, attached to radius arms 14 for cup mount.

When cup 12 is in the horizontal position, plasticized compound 15 rolls into movable horizontal cylinder bore 4. Cup 12 is then returned to the vertical position, at which time hydraulic cylinders 7 are actuated, to force movable horizontal cylinder 3, into contact with movable platen 2' of FIG. 1 or as an alternate in FIG. 10 to force movable horizontal cylinder 3, into contact with stationary platen 2", immediately after which injection ram plunger 5 moves forward in the direction of arrow E, to fill die cavity 1 with the plasticized molding compound 15 through nozzle 37 fitted in guide for nozzles 8, otherwise known as nozzle aperture, through gate 6 into dies 1.

The dies have adequate heat to cure the compound therein.

Figure 2:
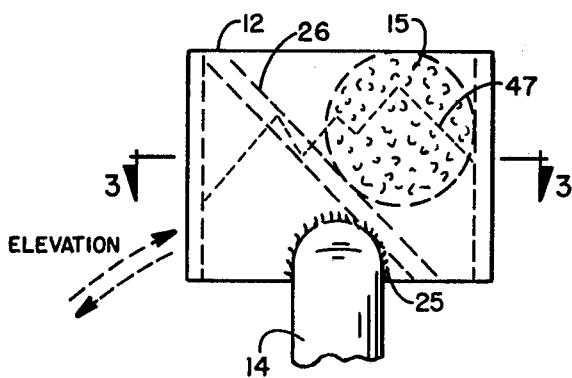
FIg. 2 is enlarged elevation view of cup 12 for plasticized compound for transfer of said plasticized compound from the plasticizing cylinder end 23 after it's cut off by guillotine blade 9. Diagonal cup plate 26 is mounted diagonally, so that when cup 12 is tilted horizontally, the preheated plasticized slug 15 falls and rolls into movable cylinder internal bore 4, vertical fin 47 top shape is shown.
Figure 3:
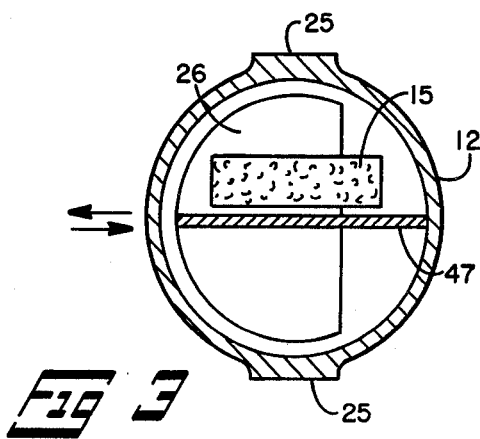
FIG. 3 is a plan view of cup 12 for plasticized compound, showing diagonal cup bottom 26, plasticized compound slug 15 vertical fin 47, cup arm anchors 25, and arrow C indicates direction of travel of cup 12, to move to a horizontal position.

At this stage of the cycle, injection ram plunger 5 is withdrawn, in direction of arrow D, FIG. 1, and hydraulic cylinder(s) 7 activated to withdraw movable horizontal cylinder 3 from contact with the platen 2' of FIG. 1 or 2" of FIG. 10 if this alternate press configuration is used.

In regard to movable horizontal cylinder 3, one or more hydraulic cylinder(s) 7 may be used to activate said horizontal cylinder 3.

The above described sequence of the molding cycle is premised on the platens being in a closed or clamped position at the start of the molding cycle.

It is to be pointed out that the components included in span 38 of FIG. 1 move as a unit actuated by main clamp cylinder 40 to close the die 1 mounted in stationary platen 2" and movable platen 2'.

Components included in span 38 of FIG. 1 ride on tie bars 42, of which there are four such tie rods in molding presses.

The plasticized compound 15, otherwise known as extrudate, cut off by guillotine blade 9, is usually the shape of a short cylinder, similar in shape to a hockey puck, and can roll quite readily. This plasticized compound 15 is dropped in cup 12 which cup contains therein a diagonal plate 26; thus, when the cup, on being moved to a horizontal position, this plate 26 acts as an inclined plane; thus plasticized material 15 rolls down said plate 26 into movable horizontal cylinder internal bore 4.

In addition to the diagonal cup plate 26 in cup 12 for plasticized compound 15, there is also mounted in said cup a thin plate 47 mounted vertical to the cup bottom, and mounted at the center location at about ½ the diameter from the edge of the cup for plasticized compound.

This thin vertical plate serves to tilt the plasticized compound 15 onto the round edge so that when the cup 12 for plasticized compound is in the horizontal position, the plasticized compound rolls down inclined plane 26 and on into movable horizontal cylinder internal bore 4, for subsequent injection into dies 1.

Cup cover barrier guide 22 is set so that it acts as a stop to prevent the plasticized compound slug 15 from being thrown out of cup for plasticized compound 12 by centrifugal action, until said cup is in the horizontal position in line with movable horizontal cylinder internal bore 4.

Cup cover barrier guide 22 has an arc sufficiently close to arc of outer dimension of cup for plasticized compound 12, that the plasticized compound slug 15 cannot leave said cup 12, in its travel to a horizontal position, until the cup is in the horizontal position at which time said slug 15 is deposited in movable horizontal cylinder internal bore 4.

The operation control of this molding procedure is briefly as follows.

Reciprocating screw 20 retracts to limit switch shut off 30 to fill cylinder 16 with molding compound from feed hopper 17. Reciprocating plasticizing screw 20 then advances forward, to be stopped by a limit switch 31, which is set to allow a predetermined amount of plasticized compound to be forced out of mouth 23 of screw cylinder 16. This plasticized material is cut off at plasticizing cylinder end 23 by the guillotine 9. This plasticized material 15 then falls into cylinder cup 12.

The above mentioned guillotine 9 is activated by the limit switch which stops the screw 20 advancement.

On activation of guillotine 9, the cut off section of plascticized material falls into cylinder cup 12. When guillotine 9 is at the bottom of its stroke, guillotine limit switch 32 activates hydraulic cylinder 11 to swing cylinder cup 12 containing the plasticized material 15 to a horizontal position as shown by dotted lines in FIG. 1. When the cylinder cup is in said horizontal position, the plasticized material 15 drops into movable horizontal cylinder internal bore 4. When cup 12 is in the horizontal position, limit switch 39 is contacted to activate hydraulic cylinder 11 to raise the transfer cup 12 to its upright position.

When the cup for plasticized compound 12 is in the upright or vertical position, after depositing the plasticized compound slug 15, then cylinder(s) 7 are activated to force movable horizontal cylinder 3, including die gates 6, and nozzles to gates 37 into intimate contact with die block - movable cavity section 2' of FIG. 1 or 2" of FIG. 10.

Injection ram plunger 5 is then activated to advance in direction of arrow E to fill the die cavity 1, with the plasticized compound 15.

After fill of the die cavity 1, which is predetermined by ram 5 travel to a preset stop, the ram 5 is activated to be withdrawn in direction of arrow D after the full compression stroke at which time hydraulic ram 7 is withdrawn to separate or break the contact of movable horizontal cylinder 3 from the die mount section 2' of FIG. 1 or 2" of FIG. 10. This break in the contact of movable horizontal cylinder 3 and die mount sections 2' of FIG. 1 or 2" of FIG. 10 is to stop the heat flow from the die section to plasticized material in movable horizontal cylinder internal bore 4.

The controls for such a molding press sequence set-up is common, and well known in the industry; thus, they are not described in detail, other than the basic limit switches for control of feed parameters for amount of plasticized material to be fed to the press for each cycle which is then repeated.

In the description of sequence of the molding cycle, this can be based on a time sequence or a pin drum rotor for sequencing, as well as the limit switches described, any of which are well known in this field of molding.

The cure of the moldings is a time function and the press is opened based on this function. The moldings are then ejected from the die and the molding sequence is then begun, on a repeating basis.

Based on the description of this invention, there may be one or more die cavities in actual practice, and for each die cavity, there must be at least one die gate 6 and nozzle to die gate(s) 37 as well as guide for nozzles 8 or otherwise known as nozzle aperture.

We claim:

1. A runnerless transfer molding apparatus for thermoset molding comprising a reciprocating screw plasticizer and means to cut off a segment of plasticized compound extruded from said plasticizer, dropping said segment of plasticized compound in a transfer cup in an upright position, and means to tilt said cup to a horizontal position to deposit said plasticized compound in a horizontal cylinder, said cylinder being the feed chamber to the nozzle and gate of the die, said plasticized compound being forced through said nozzle and gate to the die by action of injection ram plunger.

2. A runnerless transfer molding apparatus, for thermoset molding compounds wherein the horizontal cylinder of claim 1 is separable from the heated die, and said horizontal cylinder has means for temperature control.

3. A runnerless transfer molding apparatus of claim 2, wherein means are provided to hold the horizontal cylinder, nozzle and gate thereof in contact with a die cavity and mounting platen when compound is being forced through said nozzle and gate into said die cavity by an injection ram plunger.

4. A runnerless transfer molding apparatus for thermoset molding compounds of claim 2, wherein cured sprue and nozzle compound becomes attached to a dovetail groove in the face of injection ram plunger, the said ram plunger is withdrawn from the horizontal cylinder and said cured sprue and nozzle compound is forced off of said dovetail groove by action of cup for plasticized compound hitting said cured sprue compound, in a direction parallel to said dovetail groove, while depositing plasticized compound in horizontal cylinder internal bore.

5. A runnerless transfer molding apparatus for thermoset molding compounds comprising a reciprocating screw plasticizer and guillotine attached thereto whereby said guillotine cuts off a predetermined amount of plasticized compound which is dropped in a transfer cup for plasticized compound in a vertical position; thereafter said transfer cup is swung through a 90° arc to a horizontal position to deposit said plasticized compound in a movable horizontal cylinder internal bore and said horizontal cylinder is then moved in contact with the molding die and feed ram moves forward to fill the die cavity with molding compound.

* * * * *